May 26, 1970     YOSHIFUMI TORITANI ET AL     3,514,572

STRIP ELECTRODE OF TYPE FOR SUBMERGED ARC WELDING

Filed Sept. 27, 1968

YOSHIFUMI TORITANI,
MANABU HOSHIHARA AND
TAMOTSU MORIOKA,
              INVENTORS

BY *Wendroth, Lind & Ponack,*

ATTORNEYS

United States Patent Office 3,514,572
Patented May 26, 1970

3,514,572
STRIP ELECTRODE OF TYPE FOR SUBMERGED ARC WELDING
Yoshifumi Toritani, 9–17 1-chome, Kamikoshien, Nishinomiya, Hyogo Prefecture, Japan; Manabu Hoshihara, 95 2-chome, Higashidaimotsu-cho, Amagasaki, Hyogo Prefecture, Japan; and Tamotsu Morioka, 7–13 Suehirocho, Ibaragi, Osaka Prefecture, Japan
Filed Sept. 27, 1968, Ser. No. 763,333
Claims priority, application Japan, Sept. 28, 1967, 42/62,437
Int. Cl. B23k 35/00
U.S. Cl. 219—145                                    6 Claims

ABSTRACT OF THE DISCLOSURE

A strip electrode of clad type for submerged arc welding is made of a copper material having purity of not less than 95.0% and an aluminum material with purity of not less than 98.0%. The two materials are joined into one strip body not exceeding 2 mm. in thickness and 10 to 150 mm. in width, with the aluminum amount ranging 5 to 26% by weight.

---

The present invention relates to strip electrodes of clad type made of copper and aluminum for submerged arc welding.

In general, an alloy consisting of copper and 5 to 15% of aluminum is known as aluminum bronze, and conventionally it has extensively been used as covered electrodes and inert gas welding rods. However, so far as submerged arc welding with strip electrodes is concerned, it has hardly been put to use although the necessity is recognized. This is attributable to the fact that because of hard and brittle quality of aluminum bronze as a material, it is extremely difficult to subject the alloy to wire forming and rolling operation, and particularly in case of aluminum bronze containing 10% or more of aluminum, various complex processes are required even in hot working due to its extreme hardness and brittleness, thus resulting in poor productivity and a cost increase in most cases. Furthermore, since submerged arc welding with a strip electrode requires greater welding current as compared with the welding by use of a covered electrode or an inert gas welding rod, far greater amount of aluminum is lost from the alloy through the oxidation caused by the heat of welding, so that, in order to allow the deposited metal to retain a requisite amount of aluminum, there is a necessity to previously increase the aluminum content of the electrode by the amount to be lost or to supply aluminum from flux at the time of welding. As above-mentioned, however, it is difficult, because of the properties of alumium bronze, to increase the aluminum content to 10% or more, and even when aluminum is to be supplied from flux, the amount of addition exceeding 5% of the total amount of the flux lowers the melting point of the flux, resulting in such defects as poor efficiency of welding.

A principal object of the present invention is to provide, free of any trouble and in exceedingly ready and economical manner, a clad type strip electrode made of copper and aluminum for submerged arc welding which has a desired amount of aluminum required for submerged arc welding with strip electrode and with which welding operation can be readily performed by joining together two materials each solely made of copper and aluminum respectively, instead of forming the electrode from aluminum bronze.

Another object of the present invention is to provide a clad type strip electrode made of copper and aluminum for submerged arc welding in which the proportion of between copper and aluminum can easily be adjusted when they are to be formed into the electrode so that a desired aluminum content in deposited metal may be selected to consequently obtain a welded portion having excellent properties with respect to machinability, mechanical strength and the like.

The clad type strip electrode made of copper and aluminum for submerged arc welding in accordance with the present invention is characterized in that instead of being an alloy, it is formed by joining in a desired manner a copper material and an aluminum material of a desired form such as a copper plate and a aluminum plate, a copper pipe and an aluminum plate, a copper pipe and an aluminum pipe, a copper pipe and an aluminum wire, or a copper pipe and aluminum powder, the materials being bonded together into a strip shape 10 to 150 mm. in width and not more than 2 mm. in thickness, the purity of copper being not less than 95.0% and that of aluminum being not less than 98.0%, with proportion of aluminum in the range of 5 to 26% by weight.

Accordingly, the present invention can not only perfectly overcome such difficulties as encountered in rolling aluminum bronze alloy due to hard and brittle quality thereof as a material and resultant economical inefficiency, but also eliminate difficulties in allowing the deposited metal to contain a requisite amount of aluminum. Since the invention enables, in the step of joining both of the materials into a clad type electrode, to freely adjust the proportions of copper and aluminum within the range of 5 to 26% by weight of aluminum, the aluminum content to be retained in the deposited metal can be adjusted as desired within the range of 4 to 16% by weight. This is a distinctive advantage in that the invention can readily provide welded portions which are excellent in mechanical properties such as machinability, strength and the like.

In addition, because copper and aluminum each in single form are joined together, strip electrodes can be manufactured with great ease by rolling operation which, when applied to aluminum bronze, gives rise to difficulties, and electrodes in thin strip form suitable for submerged arc welding and having a thickness of not more than 2 mm. can readily be manufactured.

Strip electrodes of clad type in accordance with the present invention were tested and the results are shown in the following table. Also given for comparison purposes are the test results of the electrodes Nos. 1 and 7 which were made with aluminum proportions out of the above-mentioned range.

TEST RESULTS

| Electrode No. | Proportion by weight of Cu in electrode percent | Proportion by weight of Al in electrode percent | Proportion by weight of Al in deposited metal percent | Mechanical properties of welded portion |
|---|---|---|---|---|
| 1 | 95.5 | 4.5 | 3.0 | Poor. |
| 2 | 94.7 | 5.3 | 4.1 | Good. |
| 3 | 90.6 | 9.4 | 8.4 | Excellent. |
| 4 | 84.9 | 15.1 | 12.7 | Do. |
| 5 | 80.2 | 19.8 | 14.2 | Good. |
| 6 | 74.7 | 25.3 | 15.4 | Do. |
| 7 | 70.2 | 29.8 | 16.1 | Poor. |

It will be seen in the table above that when the weight proportion of aluminum in electrode is in the range of 5.3 to 25.3%, 4.1 to 15.4% by weight of aluminum content is retained in the deposited metal with satisfactory mechanical properties of the deposited metal maintained, while when the proportion of aluminum in the electrode is reduced to 4.5% which is lower than 5%, the aluminum content in the deposited metal drops to 3.0% by weight which is lower than 4% with resultant deterioration of mechanical properties produced in the welded portion. Further when the weight proportion of aluminum in the electrode is raised to 29.8% which is over 26%, the aluminum content found in the deposited metal is 16.1% by weight which is more than 16% with resultant segregation of aluminum taking place and a hardened portion is produced to impair the mechanical strength in the welded portion.

Though not shown in the table, the welding effect is subject to deterioration in case the proportion of aluminum in the electrode exceeds 26% by weight, and the deposition efficiency of the aluminum to be contained in the deposited metal decreases. Therefore, the proportion by weight of aluminum to be made into a clad type strip electrode of the present invention should preferably be 5 to 26%.

According to the invention, a range of 10 to 150 mm. is selected for the width of the electrode. This is because if the width is smaller than 10 mm., the electrode fails to achieve high efficiency, a purpose for which submerged arc welding with strip electrode is employed, and partly because the electrode having a width exceeding 150 mm. is hard to handle.

For the better understanding of the present invention, description will be given with reference to the accompanying drawings, in which.

Figure 1:
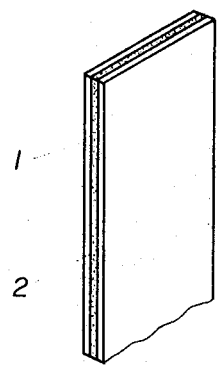
FIG. 1 is a fragmentary perspective view showing an embodiment of the electrode in accordance with the invention.

An electrode of the invention illustrated in FIG. 1 comprises two sheets of copper plates 1 and 1 having purity of 98.0% and a sheet of aluminum plate 2 having purity of 99.0% interposed therebetween, the proportion by weight of aluminum being 15%, the three sheets being joined together into a unitary body of a clad type strip electrode 1.5 mm. in thickness and 50 mm. in width.

The mode of embodiment illustrated in FIG. 1, which is capable of achieving the already mentioned effects of the invention, has advantages that because of the simplicity of the structure comprising joined materials electrodes can easily be manufactured with feasibility of mass production assured, and the amount proportion between copper and aluminum can readily be adjusted, which further enables to increase, in advance, the amount of aluminum by an amount to be lost upon welding.

Figure 2:
FIG. 2 is an enlarged front view in vertical section showing still another different embodiment of the present invention.
Figure 3:
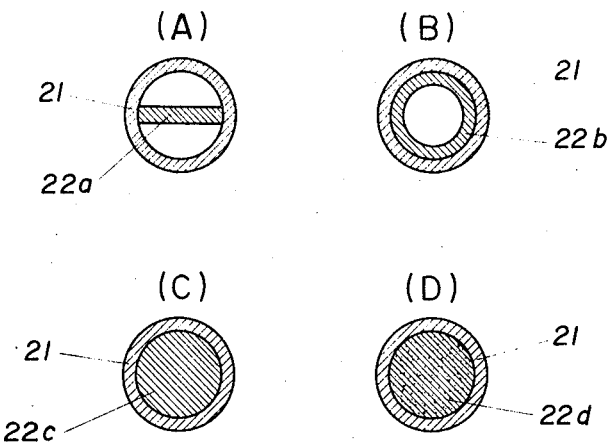
FIGS. 3(A) to (D) are front views in vertical section respectively showing the materials as they are fitted together before being rolled into the electrode shown in FIG. 2.

The electrode of the invention shown in FIG. 2 is the same as that shown in FIG. 1 so far as the purity of copper and aluminum, thickness and width of the electrode and proportion by weight of aluminum are concerned, but is different in that the longitudinal outer surface of aluminum 22 is perfectly covered with copper 21. As, for example, shown in FIGS. 3(A) to (D), the electrode of such structure comprises a copper pipe 21 and an aluminum plate 22a, aluminum pipe 22b or aluminum wire 22c inserted in the copper pipe 21, or the electrode consists of a copper pipe 21 and aluminum powder 22d charged therein, the materials being formed into a strip shape by rolling.

The previously mentioned advantages of the invention can readily be effected by this mode of embodiment. As the longitudinal external surface of the aluminum is perfectly covered with copper to keep the aluminum almost out of contact with the atmosphere, the embodiment is advantageous in that the aluminum is effectively prevented from being lost through oxidation in welding while trouble-free passage of current being also ensured at the time of welding.

Principal modes of the embodiment of the present invention described above are given only by way of example and accordingly the invention is not limited to such modes of embodiment. In accordance with the invention, those skilled in the art will be able to make numerous alterations other than the above-described embodiments, such as a strip electrode made of plural sheets of copper plates and aluminum plates, one bonded to another alternately in layers or joined together in a desired cladding manner. It should be understood that these alterations are included within the scope of the present invention so far as they do not depart from the scope of the invention as hereinafter claimed.

What is claimed is:

1. A strip electrode of the clad type for submerged arc welding comprising a copper element having purity of not less than 95.0% and an aluminum element having purity of not less than 98.0%, said materials being joined together into a single strip body with said copper element covering said aluminum element, the amount of said aluminum element being 5 to 26% by weight, said strip body having a thickness not exceeding 2 mm. and a width of 10 to 150 mm.

2. A strip electrode of the clad type for submerged arc welding as claimed in claim 1 in which said aluminum element is a plate and said copper element comprises two plates, said aluminum plate being interposed between said copper plates, both of said elements being joined together into a single strip body.

3. A strip electrode of the clad type for submerged arc welding as claimed in claim 1 in which said aluminum element is a plate and said copper element is a pipe, said plate being inserted in said pipe, both of said elements being formed together into a single strip body.

4. A strip electrode of the clad type for submerged arc welding as claimed in claim 1 in which said aluminum element is a pipe and said copper element is a pipe, said aluminum pipe being inserted in said copper pipe, both of said elements being formed together into a single strip body.

5. A strip electrode of the clad type for submerged arc welding as claimed in claim 1 in which said aluminum element is a wire and said copper element is a pipe, said wire being inserted in said pipe, both of said elements being formed together into a single strip body.

6. A strip electrode of the clad type for submerged arc welding as claimed in claim 1 in which said aluminum element is a powder and said copper element is a pipe, said powder being inserted in said pipe, both of said elements being formed together into a single strip body.

References Cited

UNITED STATES PATENTS 2,683,207   7/1954   Lewis et al. _____ 219—146

ANTHONY BARTIS, Primary Examiner

L. A. ROUSE, Assistant Examiner